United States Patent [19]

Rosano

[11] Patent Number: 4,472,291

[45] Date of Patent: Sep. 18, 1984

[54] HIGH VISCOSITY MICROEMULSIONS

[76] Inventor: Henri L. Rosano, 848 Woodland Ave., Oradell, N.J. 07649

[21] Appl. No.: 473,078

[22] Filed: Mar. 7, 1983

[51] Int. Cl.³ ...................... B01J 13/00; C01B 11/06; C01B 15/01

[52] U.S. Cl. .......................... 252/186.28; 252/187.24; 252/312; 252/8.55 D; 252/DIG. 13; 166/274; 166/275; 424/170; 424/171

[58] Field of Search ............. 252/8.55 D, 312, 186.28, 252/187.24; 166/274, 275

[56] References Cited

U.S. PATENT DOCUMENTS

| | | | |
|---|---|---|---|
| 3,778,381 | 12/1973 | Rosano et al. | 252/311 |
| 3,998,733 | 12/1976 | Blanchard et al. | 252/312 |
| 4,146,499 | 3/1979 | Rosano | 252/186.25 |
| 4,271,907 | 6/1981 | Gale | 252/8.55 D |
| 4,337,163 | 6/1982 | Schilp | 252/187.24 |
| 4,353,806 | 10/1982 | Canter et al. | 166/274 |

Primary Examiner—Richard D. Lovering
Assistant Examiner—Anne Brookes
Attorney, Agent, or Firm—Brumbaugh, Graves, Donohue & Raymond

[57] ABSTRACT

An oil-in-water microemulsion of increased viscosity is disclosed, which microemulsion comprises an aqueous continuous phase, an oil phase, a primary surfactant having a lipophilic moiety and a hydrophilic moiety, wherein the hydrophilic moiety carries an electrostatic charge and a cosurfactant. The viscosity is increased by adding a secondary surfactant which is characterized by a long chain lipophilic moiety and a charged hydrophilic moiety which is reactive with the charged hydrophilic moiety of the primary surfactant. In forming the microemulsion of increased viscosity, the microemulsion is formed first in the absence of the secondary surfactant, and the secondary surfactant is added thereto.

12 Claims, No Drawings

HIGH VISCOSITY MICROEMULSIONS

This invention relates to microemulsions. More particularly, it relates to a viscous oil-in-water microemulsion.

Microemulsions have heretofore been known in which water or various liquids of an essentially aqueous nature are dispersed in an oil phase. By a microemulsion I am referring to such a dispersion in which the dispersed droplets are of substantially colloidal dimension, i.e. a diameter of less than about one-half micrometers, and usually having a diameter of 50 to 1000 A. Typically, microemulsions can be recognized and distinguished from ordinary emulsions in that the microemulsion is more stable and usually substantially transparent.

There has been only limited success in preparing microemulsions of an essentially lipophilic phase dispersed in water. One such example of an oil-in-water microemulsion having a HLB close to that of the primary surfactant is set forth in my prior U.S. Pat. No. 3,778,381. The aforementioned patent described the preparation of a microemulsion of certain fluorinated organic compounds dispersed in an aqueous system.

A more general procedure for preparing microemulsions of the oil-in-water type is disclosed in my U.S. Pat. No. 4,146,499. As described in that patent, such emulsions can be prepared by a procedure in which the oil from which the dispersed phase is formed is placed in water along with a suitable quantity of a primary surfactant. Among the primary surfactants mentioned in the '499 patent are compounds characterized by a lipophilic moiety having a charged hydrophilic moiety at one end. Examples are the common surface-active agents such as the carboxylates, sulfates and sulfonates of fatty compounds as well as the fatty amine oxides. The mixture of the oil, water and primary surfactant is then agitated to produce a lactescent emulsion of oil dispersed in water. A cosurfactant is added, having an HLB close to that of the primary surfactant (typically an amyl or hexyl alcohol), in an amount sufficient to clarify the lactescent emulsion and form the microemulsion.

The theory of the formation of an oil in water microemulsion is now generally understood to be as follows:

The amount of primary surfactant which is employed is sufficient that once a microemulsion is formed substantially all of the surfactant will be adsorbed on the surface of the droplets forming the microemulsion with the lipophilic portion of the surfactant directed toward the interior of the oil droplet and the hydrophilic portion of the surfactant covering the surface of the droplet and in contact with the continuous aqueous phase. Calculations from the measurements of the droplet size of the individual droplets making up a microemulsion, the molecular size of the primary surfactant, and the relative amounts of primary surfactant and oil phase have shown that the surface of the individual droplets making up a microemulsion is substantially entirely covered by adsorbed primary surfactant, and that little, if any, primary surfactant will be found dissolved in either the oil phase or the aqueous phase. Increasing the amount of primary surfactant will result in smaller droplets being formed as the dispersed phase of the microemulsion; smaller amounts of primary surfactant will result in a microemulsion having a larger droplet size in the dispersed phase.

The thermodynamic conditions which exist in a simple mixture of oil, water and primary surfactant do not favor the formation of a microemulsion, which has a large surface area. These conditions are brought about by the so-called "cosurfactant" which produces a very low transitory interfacial tension and thereby permits the formation of a microemulsion. This is followed, however, by a final positive interfacial tension which forms spherical droplets. The oil-in-water microemulsion, once formed, is essentially a transparent emulsion of high stability.

Microemulsions formed as described above are relatively of low viscosity. The viscosity of the emulsion is usually close to the viscosity of the aqueous phase in which the oil droplets are dispersed. For a number of applications which will be more apparent below, there is a need to provide an oil in water microemulsion of increased viscosity. In some cases, the viscosity of the microemulsion originally between 1 and 100 centipoises may be increased by 10 to 100 fold; in other cases it may be desired to increase the viscosity sufficiently that the microemulsion is essentially a gel.

Microemulsions of increased viscosity in accordance with the present invention are obtained by employing certain secondary surfactants which are reactive with the primary surfactant. As noted above, one method of forming an oil in water microemulsion involves the use of a primary surfactant which has a lipophilic moiety and a charged hydrophilic moiety at one end of the structure. In accordance with the present invention, the viscosity of such a microemulsion is increased by titrating it with a secondary surfactant which is a compound having a long chain lipophilic moiety with a charged hydrophilic moiety at one end thereof but in which the charge of the hydrophilic moiety of the secondary surfactant is reactive with the charge of the hydrophilic moiety of the primary surfactant. The size and amount of secondary surfactant employed will depend on the amount of viscosity increase desired.

Typical secondary surfactants are those in which the lipophilic moiety is a long chain aliphatic group of at least 8 carbon atoms. Other suitable surfactants may include aryl rings, i.e., the alkyl-aryl compounds having similar effective chain links. Ether linkages may also be present as in the alkanol-ethylene oxide sulfates. Other similar surfactants will be obvious to those skilled in the chemistry of surface active compounds and are suitable for use in the present invention. The maximum chain length of the secondary surfactant depends on the nature of the hydrophilic group and is related to the requirement that the hydrophilic-lipophilic balance of the surfactant is such that it distributes between the aqueous and oil phases. If the secondary surfactant is characterized by a long chain aliphatic or aryl-aliphatic moiety it will typically contain up to 8–24 carbon atoms. If the lipophilic moiety contains ether linkages, such as an ethylene oxide or propylene oxide condensate, the lipophilic moiety can be longer.

While the present invention is not to be limited to any particular theory, I believe that the secondary surfactant is effective to increase viscosity of the microemulsion because it reacts with the charged portion of the primary surfactant on the surface of the droplets forming the microemulsion with the lipophilic "tail" of the secondary surfactant extending away from the surface of the droplets. Each droplet may be visualized as becoming like a sea urchin. Steric hindrance, is thereby created between adjacent droplets of the microemulsion. This conclusion is supported by theoretical calculations as to the chain length of the secondary surfactant and the interdroplet distance of the microemulsion. When the chain lengths of the secondary surfactant are sufficiently long relative to the interdroplet distance to create substantial steric hindrance, greater increases in the viscosity of the microemulsion are observed.

In carrying out the present invention, the order of addition of the various ingredients is important. Bearing in mind that the primary surfactant and secondary surfactant are reactive with each other, if the two ingredients are added simultaneously to the oil and water emulsion prior to formation of the microemulsion, little effect on viscosity will be observed, and indeed it may be impossible under those circumstances to even form the microemulsion because the secondary and primary surfactants will have neutralized each other. Accordingly, in the present invention, the microemulsion should be formed first as described in my U.S. Pat. No. 4,146,499 and thereafter the secondary surfactant is added.

In this manner, an oil in water microemulsion of increased viscosity is obtained which comprises (A) a microemulsion having a continuous aqueous phase, an oil phase substantially immiscible with the aqueous phase and which is dispersed therein, a primary surfactant having a lipophilic moiety and a charged hydrophilic moiety in an amount effective to disperse the oil phase into fine droplets and an amount of a co-surfactant effective to form the microemulsion; and (B) a long chain secondary surfactant which has been added to the microemulsion (A) after formation thereof in an amount effective to increase the viscosity of the microemulsion, which secondary surfactant has a lipophilic moiety and a hydrophilic charge reactive with the hydrophilic charge of the primary surfactant.

Materials suitable for making the oil-in-water microemulsion to which the present invention may be employed are described in my U.S. Pat. No. 4,146,499, the disclosure of which is hereby incorporated by reference. Lipophilic substances include solvents such as light mineral oils, toluene, etc.; mixtures thereof with lanolin, fluorocarbons, silicones such as dimethyl siloxane, natural waxes, synthetic waxes, (such as polyethylene wax), and fabric and hair conditioners. Microemulsions may also include various ancillary ingredients such as may be employed in shampoos, shaving creams and cosmetics etc. Still other materials including the edible fats, waxes or oils such as mono, di and triglycides which are insoluble or immiscible in water. The aqueous phase may in addition to water include a variety of water soluble substances, for example, sodium hypochlorite, $H_2O_2$ and water soluble salts. Either or both of the aqueous and oil phases may include a variety of active ingredients as may be suited to the application for which the particular microemulsion is intended.

Examples of ingredients which may be soluble in the oil phase and therefore advantageously applied in the present invention are the following:

(1) Antimicrobials such as chloramphenicol palmitate and erythromycin stearate.

(2) Anesthetics, such as halothane, lidocaine, tetracaine and butacaine.

(3) Aromatic oils such as eucalyptol.

(4) stearoids and hormones such as estradiol benzoate, benzestrol and cortisones.

(5) Sun screen agents.

(6) Insoluble dyes such as FDC dye, yellow No. 11, orange No. 17 and red such as No. 7, 8, 9 and 17.

The '499 patent refers to a variety of surfactants, anionic, cationic, nonionic or amphiphatic, which may be used as the primary surfactant to form a microemulsion. The present invention requires that the primary surfactant carry a charge in the hydrophilic end thereof, which excludes utilization of many nonionic substances. However, it is not required that the primary surfactant be completely ionic in character. Some of the preferred primary surfactants in the present invention are the amine oxides and ethylene oxide sulfate. The amine oxides are not ionic; however there is a charge separation within the molecular structure such that the amine oxide moiety carries a positive charge and will thus react with a negatively charged secondary surfactant in the practice of the present invention. Amine oxides suitable for use in the present invention include cetyl dimethyl amine oxide, myristyl dimethyl amine oxide, decyl amino betaine, as well as the mixed alkyl dimethyl amine oxides containing from 12 to 18 carbon atoms in the alkyl group. Ionic primary surfactants can, of course, be used.

Examples of suitable ionic primary surfactants include the fatty acid soaps, and the long chain alkyl or aralkyl sulfates and ethylene oxide sulfate and sulfonates having from 12 to 20 carbon atoms in the alkyl group. Other primary surfactants mentioned in the '499 patent are suitable for use in the practice of the invention. As described in my prior patent, the primary surfactant should be selected in relation to the oil and water phases such that the hydrophilic-lipophilic balance (HLB) of the surfactant will produce a fine lactescent emulsion.

The cosurfactant as described in U.S. Pat. No. 4,146,499 is an amphiphatic substance having a higher HLB than the primary surfactant. The group includes not only common water soluble surface active agents, but also short chain alcohols, for example, pentanol or hexanol. In the practice of the invention, a short chain alcohol such as a $C_4$–$C_8$ alcohol represents a preferred embodiment. Where an oxidizing agent is present, the co-surfactant is preferably a tertiary alcohol such as t-amyl alcohol.

The secondary surfactants contemplated in the present invention typically have at least 8 carbon atoms in the lipophilic moiety with a charged hydrophilic moiety on one end such as the amine oxides, carboxylates, sulfonates, sulfates, etc. The lipophilic moiety of suitable secondary surfactants may include aryl groups, i.e. the alkyl aryl compounds having similar effective chain links. Ether linkages may also be present as in the alcohol-ethylene oxide sulfates. Similar surfactants will be obvious to those skilled in the chemistry of surface active compounds and are suitable for use in the present invention. In general the secondary surfactants can be selected from the same broad class of compounds as described from which the primary surfactant is selected; however, it will be selected to have a hydrophilic group charged oppositely to the hydrophilic group of the primary surfactant.

If the formulation contains an oxidizing agent such as hyprochlorite or hydrogen peroxide, all of the primary, co-surfactant and secondary surfactants should be selected to be non-oxidizable and free of impurities which would react with the oxidizing agent. Amine oxide, tertiary alcohols and long chain ether sulfates have been found suitable for bleach or peroxide containing formulas.

As explained above, the present invention is believed to be dependent on an adsorption of the secondary surfactant to the surface of the droplets forming the microemulsion by reason of electrostatic attraction between the secondary surfactant and the primary surfactant. However, it has been found that if the reactivity between the primary surfactant and secondary surfactant is too great, the two surfactants will completely neutralize each other and destroy the desired microemulsion. For this reason, the primary and secondary surfactants normally should not both be strong ionic reagents. As a rule, for example, a primary surfactant which is a quaternary ammonium compound, (strongly cationic) will not produce desirable results with a secondary surfactant which is an alkyl or sulfonate (strongly anionic). Best results are obtained when one of the two surfactants is only moderately charged. For example, a primary surfactant which is an amine oxide (moderately cationic) used in combination with a secondary surfactant which is a sulfate or sulfonate (strongly anionic), or vice versa.

In addition to increasing viscosity, as described above, other ingredients may be included which will increase the viscosity of the aqueous phase. For example, amine oxides can be combined with fatty sulfates or sulfonates in the continuous (aqueous) phase which will react with each other to form a lattice network surrounding the droplets of the microemulsion which will increase the viscosity of the aqueous phase. In some cases, it may be desirable or advantageous to combine a viscosity increase brought about in accordance with the present invention (i.e. by using reactive primary and secondary surfactants) upon which is superimposed additional viscosity increases brought about by incorporation reagents which will cause a thickening of the continuous phase.

Microemulsions in accordance with the present invention may be applied to a variety of purposes. Examples of applications include hard surface cleaners, shampoos, lotions, salves or creams, for cosmetic or medicinal purposes, car waxes, window cleaners, anti-rust formulations and floor polishes.

Another application of the present invention may be found in tertiary oil recovery. It has heretofore been the practice in tertiary oil recovery to flood the oil field with a surfactant, which is followed by a high viscosity polymeric solution which is effective to force the surfactant through the oil field without channeling. A microemulsion of the present invention may be used to supply both the detergent required to modify the surface characteristics within the oil bearing sands and a composition having a viscosity which is effective to prevent channeling. Thereby the need for a second polymeric solution to follow the aqueous surfactant solution is made unnecessary.

The present invention will be further understood from the following examples.

EXAMPLE 1

20 milliliters of kerosene, 40 milliliters of a 30% solution of myristyl dimethyl amine oxide, and 100 milliliters of a $2\frac{1}{2}\%$ solution of sodium hypochlorite were combined and agitated to form a lactescent emulsion. The emulsion was titrated with 19.8 cc's of t-amyl alcohol which converted the lactescent emulsion to a microemulsion, the microemulsion had a viscosity of 10 cp. and a transmission of 96%.

Thereupon 15 cc's of a solution of a fatty alcohol-ethylene oxide condensate-sodium sulfate known by the trade name of Genapol ZRO was added. The commercial material is believed to be based on a $C_{12}$–$C_{14}$ alcohol, to contain 2–3 ethylene oxide units. The preparation was a 28% aqueous solution. This increased the viscosity of the original microemulsion to 32 cp. Addition of another 44 ccs of Genapol ZRO solution increased the viscosity further to 225 cp. Both formulations were clear, stable microemulsions.

EXAMPLE 2

40 cc's of kerosene, 60 cc's of Genapol ZRO solution (described above in Example 1) and 100 cc's of a 5% sodium hypochlorite solution were combined and agitated to form a lactescent emulsion, thereupon the lactescent emulsion was titrated with 18.3 cc's of t-amyl alcohol to obtain a microemulsion. The microemulsion was a clear solution having 96% transmittance and a viscosity of 95 cp.

Addition of myristyl dimethyl amine oxide (30% solution) increased the viscosity of the microemulsion of this example to 450 cp. Titration of the same solution with a 30% solution of cetyl dimethyl amine oxide increased the viscosity of the microemulsion to 250 cp.

EXAMPLE 3

1,000 cc's of a 5.25% solution of sodium hypochlorite, 80 cc's of myristyl dimethyl amine oxide (30%), 30 cc's of kerosene and 130 cc's of a 5% solution of tetrapotassium pyrophosphate were combined and agitated to form a lactescent emulsion. Adding 47.6 cc's of t-amyl alcohol produced a microemulsion. The microemulsion was a clear solution having 88% transmittance, a viscosity of 5 cp and a pH of 11.9.

To a 100 cc portion of the foregoing microemulsion, 2.0 grams of sodium dodecyl sulfate were added. This increased the viscosity of the microemulsion to 220 cp. and converted it to a white opaque solution.

To another 100 cc. portion of the above microemulsion, 2.0 grams of sodium dodecyl sulfate and 2.0 grams of calcium carbonate were added. In still another test, 2.0 grams of sodium dodecyl sulfate and 2.0 grams of clay were added to the microemulsion of this example. Both resulted in stable high viscosity emulsions containing the suspended sodium carbonate or clay in a stable suspension.

By increasing the amount of sodium dodecyl sulfate added to the microemulsion of the present example to about 6 grams per 100 cc of emulsion, the viscosity of the microemulsion may be further increased to about 450 cp.

It is preferred to add the secondary surfactant to the cleared microemulsion without substantial delay after it is formed. To illustrate this, further portions of the microemulsion of this example were allowed to age 24 hrs. Thereupon from 2 to 7 grams of sodium dodecyl sulfate were added to separate 100 cc portions of the microemulsion of this example. Where an addition of 2.0 grams of sodium dodecyl sulfate promptly after forming the emulsion, resulted in an increase in viscosity to about 220 cp., if the microemulsion was aged 24 hrs. before adding the SDS the viscosity increased to only 100 cp. The maximum viscosity obtained when adding 7 gm. SDS to 100 cc of the microemulsion of this example which had been aged for 24 hrs. was about 150 cp.

EXAMPLE 4

200 grams of potassium tripolyphosphate dissolved in one liter of water were combined with 1 liter of a 5.25% solution of sodium hypochlorite and 200 cc's of a 30% solution of a mixture of myristyl dimethyl amine oxide and cetyl dimethyl amine oxide. The pH was adjusted to 11.9 using potassium hydroxide and then 100 cc's of kerosene were added. The mixture was agitated to form a lactescent emulsion and then titrated with 98.5 cc's of t-amyl alcohol to form a microemulsion. The microemulsion had a viscosity of 2.5 cp.

To 100 cc's of portions of the foregoing microemulsion varying amounts of Genapol ZRO and 2 grams of calcium carbonate were added:

| Genapol ZRO (grams)* | Viscosity of Resulting Microemulsion |
| --- | --- |
| 10 | 40.5 |
| 20 | 96.5 |
| 25 | 290 |
| 30 | 675 |
| 40 | 1105 |

*In this example Genapol ZRO was used in the form of a paste of about 68% active.

The foregoing microemulsions were allowed to stand to determine how rapidly the calcium carbonate separated. With 10 to 20 grams of Genapol ZRO added, the calcium carbonate suspension separated within an hour. When 25 grams of Genapol ZRO had been added, increasing the viscosity of the microemulsion to 290, overnight settling was required to obtain separation. With 30 grams of Genapol ZRO added, giving a microemulsion of 675 cp, the suspension remained stable at least a week at room temperature. The sample to which 40 grams of Genapol ZRO had been added, having a viscosity of 1105 cp. was tested for stability at 40° C. The calcium carbonate remained in a stable suspension in that sample for the duration of a one week test period.

The microemulsion can be thickened with mixtures of secondary surfactants if desired. As an illustration, I refer to the partially thickened microemulsion of this example containing 10 grams of Genapol ZRO paste (68% active) which is described above having a viscosity of 40.5 cp. To 100 cc. portions of that microemulsion, varying amounts of sodium dodecyl sulfate were added as follows:

| Amount of SDS (grams) | Resulting Viscosity |
| --- | --- |
| 1 | 75, 82* |
| 2 | 152, 164* |
| 3 | 225, 220* |
| 4 | 345, 352* |
| 5 | 440 |

*Repeat tests were made in each of these cases and the viscosities of the repeated tests are reported.

EXAMPLE 5

50 milliliters of myristyl dimethyl amine oxide (30% solution), 25 milliliters of kerosene and 100 ml of sodium hypochlorite (2.5% solution) were agitated to form a lactescent emulsion, the emulsion was then titrated with 9.6 milliliters of t-amyl alcohol to obtain a microemulsion. When 50 milliliters of the foregoing microemulsion were combined with 5 milliliters of a 60% solution of myristyl sodium sulfonate, a microemulsion of increased viscosity results. When 50 milliliters of the basic microemulsion of this example were combined with 2.0 grams of sodium dodecylsulfate, the microemulsion is converted to an opaque gel having a viscosity of $7.6 \times 10^6$ cp.

EXAMPLE 6

1 mm. of hexadecane (99%) was combined with 100 mm. of water and 2.5 cc's of Ammonyx CETAC, 25% solution (cetyl trimethyl ammonium chloride) and agitated to form a lactescent emulsion. The mixture was tritrated with 1.5 ml. of 1-pentanol to obtain a microemulsion having a transmittance of 97% at 490 nm.

The clear microemulsion was titrated with 7 ml. of 0.25 M sodium dodecyl sulfate. This increased the viscosity of the microemulsion to 45 cps.

EXAMPLE 7

7.5 milliliters of toluene were combined with 100 milliliters of water and 20 milliliters of a 30% solution of lauryl dimethyl amine oxide. The mixture was agitated to form a lactescent emulsion and then titrated with 5.2 milliliters of t-amyl alcohol. The resulting microemulsion had a viscosity of 10 cp and a transmittance of 95%.

When 100 cc's of the foregoing microemulsion were combined with 10 grams of Genapol ZRO (paste, 68%) and 5.5 grams of sodium dodecylsulfate, the viscosity of the microemulsion was increased to 57 cp. Addition to the partially thickened microemulsion of 5 ml of myristyl dimethyl oxide further increased the viscosity to about 470 cp.

EXAMPLE 8

100 milliliters of water, 50 milliliters of toluene and 200 milliliters of a 30% solution of lauryl dimethyl amine oxide were combined and agitated to form a lactescent emulsion. The emulsion was tritated with 41 milliliters of t-amyl alcohol, the resulting microemulsion had a low viscosity and a percent transmittance of 90%.

To a 100 cc. portion of the foregoing microemulsion, 6.0 grams of Genapol ZRO and 3.0 grams of sodium dodecyl sulfate were added. The viscosity of the microemulsion was increased to 120 cp.

To another 100 cc. portion of the microemulsion of this example, 5.0 grams of myristyl dimethyl amine oxide and 3.0 grams of sodium dodecyl sulfate were added which increased the viscosity of the microemulsion to 275 cp.

To a third 100 cc. portion of the microemulsion of this invention, 10.0 grams of a 60% solution of myristyl sodium sulfonate, 10.0 grams of myristyl dimethyl amine oxide and 5.0 grams of Genapol ZRO were added, the resulting microemulsion was clear and had a viscosity of 748 cp.

EXAMPLE 9

100 milliliters of water, 3.5 ml. of dodecane, 10 ml. of 30% hydrogen peroxide and 20 grams of Standepol ES-40 (sodium myristyl ethylene oxide sulfate) were combined to form a lactescent emulsion. The mixture was titrated with 16.6 ml. t-amyl alcohol to form a microemulsion, and the pH was then adjusted to 4.5.

To the foregoing microemulsion 2 thus were added 15 grams of Genapol ZRO paste, 20 grams of dimethyl myristyl amine oxide and 10 grams of sodium chloride. The mixture was agitated to disolve the solids. A clear microemulsion of increased viscosity resulted. The final mixture had a viscosity of 260 cp measured in a Hercules viscometer at 60 rpm.

I claim:

1. An oil-in-water microemulsion of increased viscosity comprising:

(A) a microemulsion of
  (1) an aqueous continuous phase;
  (2) an oil phase which is substantially immiscible with the aqueous phase and dispersed therein;
  (3) a primary surfactant which is a compound having a lipophilic moiety and charged hydrophilic moiety in an amount effective to disperse said oil phase into droplets of a diameter of less than 0.5 micrometers; and
  (4) an amount of cosurfactant effective to form a clear dispersion; and
(B) a long chain secondary surfactant having a lipophilic moiety which has been added to said microemulsion (A) after formation thereof in an amount sufficient to increase the viscosity of the microemulsion; said secondary surfactant being characterized by a long chain lipophilic moiety and a charged hydrophilic moiety which is reactive with the charged hydrophilic moiety of the primary surfactant.

2. A microemulsion according to claim 1, wherein the primary surfactant in said microemulsion is a fatty amine oxide effective to disperse said oil phase and said secondary surfactant is an anionic surface active agent.

3. An oil-and-water emulsion according to claim 1, wherein the primary surfactant is an anionic surface active agent effective to disperse said oil phase and said secondary surfactant is a fatty amine oxide.

4. A microemulsion according to claim 1, 2 or 3, wherein said co-surfactant is an $C_4$–$C_8$ alcohol.

5. A microemulsion according to claim 4, wherein the emulsion contains an oxidizing agent and the primary surfactant, co-surfactant and secondary surfactant are substantially non-oxidizable.

6. A microemulsion according to claim 5, wherein said oxidizing agent is hydrogen peroxide or a hypochlorite.

7. A method of increasing the viscosity of an oil-in-water microemulsion wherein said microemulsion comprises:
  (1) an aqueous continuous phase;
  (2) an oil phase which is substantially immiscible with the aqueous phase and dispersed therein;
  (3) a primary surfactant which is a compound having a lipophilic moiety and charged hydrophilic moiety in an amount effective to disperse said oil phase into droplets of a diameter of less than 0.5 micrometer; and
  (4) an amount of cosurfactant effective to form a clear dispersion; wherein the viscosity of said microemulsion is increased by adding thereto, after the microemulsion has been formed, a long chain secondary surfactant having a lipophilic moiety in an amount sufficient to increase the viscosity of the microemulsion; said secondary surfactant being characterized by a long chain lipophilic moiety and a charged hydrophilic moiety which is reactive with the charged hydrophilic moiety of the primary surfactant.

8. A method according to claim 7, wherein the primary surfactant in said microemulsion is a fatty amine oxide effective to disperse said oil phase and said secondary surfactant is an anionic surface active agent.

9. A method according to claim 8, wherein the primary surfactant is an anionic surface active agent effective to disperse said oil phase and said secondary surfactant is a fatty amine oxide.

10. A method according to claim 7, wherein the co-surfactant is an $C_4$ to $C_8$ alcohol.

11. A method according to claim 10, wherein the microemulsion contains an oxidizing agent and the primary surfactant, co-surfactant and secondary surfactant are substantially non-oxidizable.

12. A method according to claim 11, wherein said oxidizing agent is a peroxide or a hypochlorite.

* * * * *